June 8, 1965   J. A. GAYLORD   3,187,395
SNAP FASTENER FOR A LOOP OR STRAP
Filed Dec. 5, 1963   2 Sheets-Sheet 1
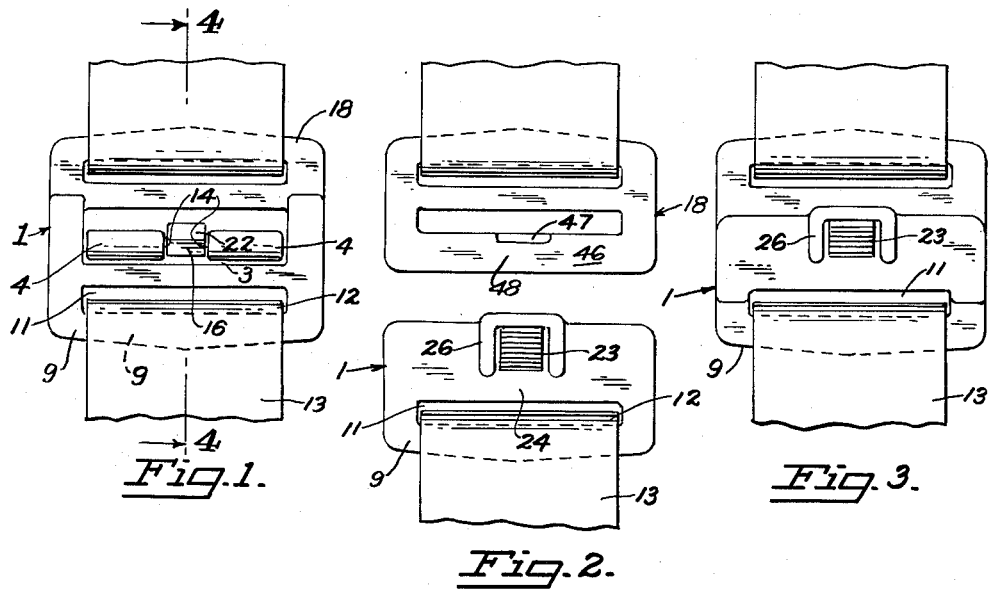
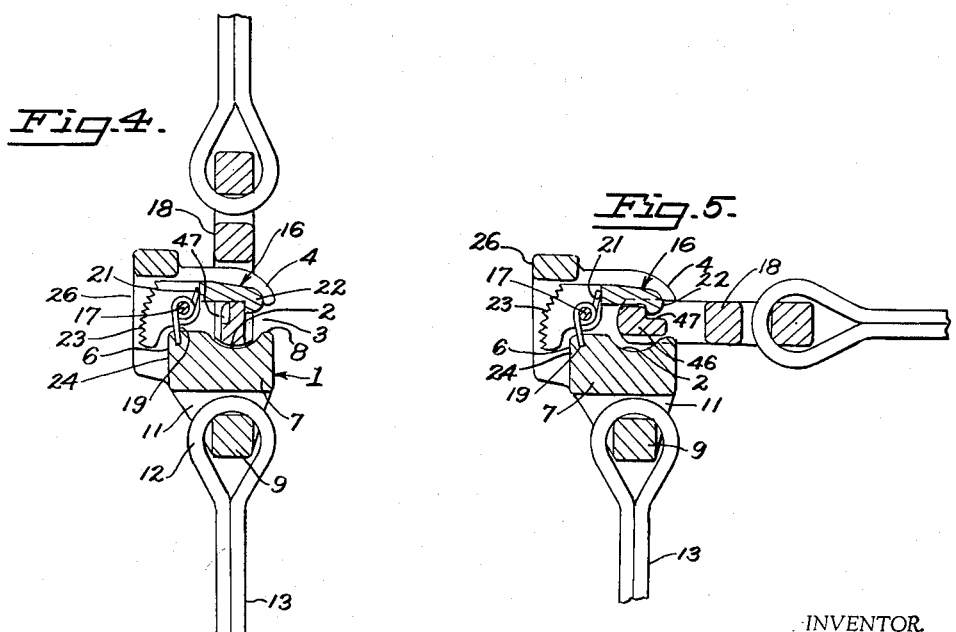
INVENTOR.
JOHN A. GAYLORD
BY
George B. White
ATTORNEY June 8, 1965  J. A. GAYLORD  3,187,395
SNAP FASTENER FOR A LOOP OR STRAP
Filed Dec. 5, 1963
2 Sheets-Sheet 2
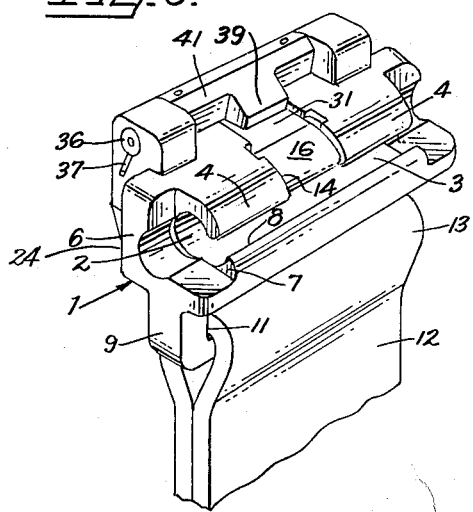
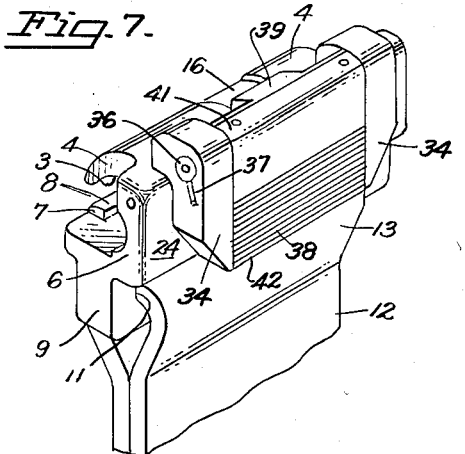
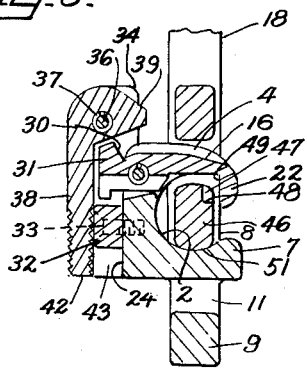
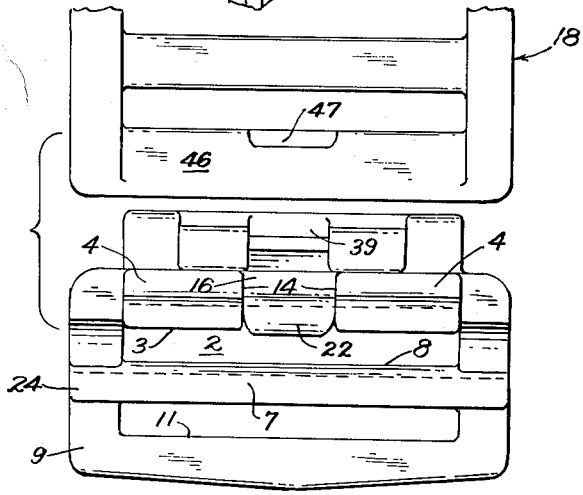
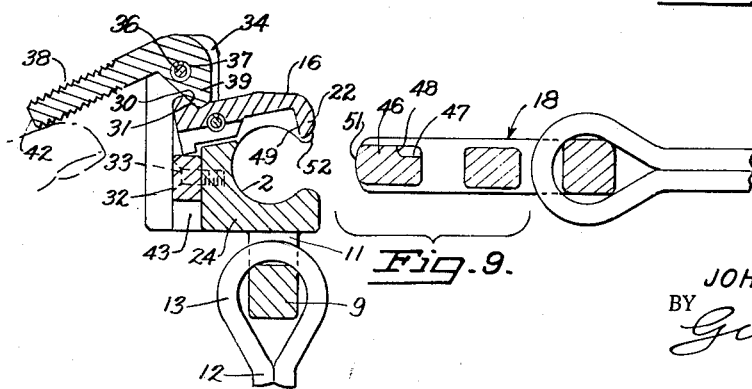
INVENTOR.
JOHN A. GAYLORD
BY
George B. White
ATTORNEY

United States Patent Office 3,187,395
Patented June 8, 1965

3,187,395
SNAP FASTENER FOR A LOOP OR STRAP
John A. Gaylord, San Rafael, Calif., assignor to H. Koch & Sons, Inc., Corte Madera, Calif., a corporation of California
Filed Dec. 5, 1963, Ser. No. 328,382
4 Claims. (Cl. 24—235)

This invention relates to a snap fastener for a loop or strap.

The primary object of the invention is to provide a positively locking snap fastener which cannot be accidentally disengaged and thereby rendering it particularly safe in connection with releasable connections needed for aircraft personnel equipment such as parachutes, survival kits and the like.

Particularly it is an object of the invention to provide a simple fastener which is provided with a pair of spaced hooks for lateral insertion and engagement by a ring or loop or strap, and a movable hook between the spaced fixed hooks pivoted transversely of the other hooks so as to be movable in engagement with a ring or loop in the cavity of the hooks so as to lock the ring in place; the said movable hook being resiliently urged into locking position; and a button suitably shielded but readily engageable by the aircraft personnel for moving the movable hook out of locking position for releasing the ring; the ring and hook being adapted to coact for preventing accidental release of the ring from the hook.

Another object of the invention is to provide easy and convenient manipulation for the releasing of the movable hook between the spaced fixed hooks of such fastener for rings, hooks and the like, yet preventing release until the ring and the hook are turned in a relative releasing attitude.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a view showing the snap fastener engaged with a ring to connect a pair of straps showing the fastener from the hook side.

FIG. 2 is a view showing the fastener disengaged, viewing from the releasing button side.

FIG. 3 is a view showing the fastener engaged viewing it from the button side of the fastener.

FIG. 4 is a sectional view of the hook fastener, the section being taken on lines 4—4 of FIG. 1.

FIG. 5 is a sectional view showing the strap loop ready for disengagement.

FIG. 6 is a perspective view of a modified form of the fastener viewing it from the hook side.

FIG. 7 is a perspective view of the modified form of the fastener viewing it from the manipulating flap side.

FIG. 8 is a cross-sectional view of the modified fastener in hooked position.

FIG. 9 is a cross-sectional view of the modified form of the fastener in releasing position.

FIG. 10 is a front view of the fastener looking toward the hooks disengaged.

In each form of the invention herein there is provided an elongated frame 1 in which there is formed a longitudinal generally cylindrical receptacle cavity 2, in such a manner that one side of the cavity is open to form a longitudinal slot 3 for the insertion of a ring or loop or the like. The substantially cylindrical cavity 2 and the longitudinal slot 3 form a hook shape. The hook shaped portion of the frame is cut away transversely of the body so as to divide the hook shaped form of the frame into a pair of spaced hooks 4.

The foredescribed body, therefore, after the forming of the longitudinal receptacle cavity 2, consists of a back wall 6 with a dished or curved base 7 projecting therefrom and terminating in a slightly raised rounded ledge 8 spaced from the ends of the pairs of hooks 4 by the forming of the longitudinal slot 3.

From the bottom of the base 7 extends a suitable strap retainer, for instance in this illustration a flange 9 with a longitudinal slot 11 in which the loop 12 of a strap 13 may be fastened. In the cut-away space 14 between the hooks 4 is movable a snap hook 16. This snap hook 16 is pivoted on a pivot pin 17 in the back wall 6 longitudinally so that the snap hook 16 can move into and out of the cavity 2 respectively for holding or releasing a ring or loop or connector frame 18. A coil spring 19 around the pivot pin 17 is anchored at one end thereof in the back wall 6 and at its other end it bears against the wall of a slot 21 in the snap hook 16 so as to urge the snap hook 16 normally toward the receptacle cavity 2 for engaging the loop or ring. For this purpose the end of the snap hook 16 at the cavity 2 is provided with a lip 22 projecting into the cavity 2 beyond the free edges of the hooks 4 so as to obstruct the middle portion of the longitudinal receptacle slot 3 and resist the release or disengagement of a ring therefrom. The snap hook 16 has a button 23 thereon which extends to the other side of the pivot pin and projects in a spaced relation downwardly along the back face 24 of the back wall 6 so that when the offset projecting portion of the bottom 23 is pressed toward the back face 24 it turns the snap hook 16 around its pivot and thereby raises the snap hook 16 so as to lift the lip 22 out of its obstructing position, thereby to permit the removal of a ring or loop from the receptacle cavity 2 through the longitudinal slot 3. The button 23 is suitably serrated for positive engagement by the thumb or finger of the manipulator.

In order to prevent accidental release of the ring, which is particularly important in connection with equipment carried by an aviator or aircraft personnel, the back face 24 of the back wall 6 is provided with a generally U shaped shield 26 projecting beyond the button 23 so as to leave only sufficient space for the movement of the button 23 toward the back wall 24.

The modified form shown in FIGS. 6–10 inclusive is generally the same as the form heretofore described, except that instead of the button 23, the snap hook 16 is provided with an enlarged lug 31 defining a generally V shaped recess 30 beyond the pivot pin 17. On the back face 24 is suitably mounted a bracket base 32 by screws 33 or the like. From each end of the bracket base 32 project pivot brackets 34 extending above and over the top of the back wall 6 as well as outwardly of the back wall 6. A pivot shaft 36 is journalled in the projecting portions of the pivot brackets 34. A coil spring 37 on the pivot shaft 36 normally urges the pivot shaft 36 into a position to move a handle flap 38 thereon over the bracket base 32 and between the pivot brackets 34 into concealed position. The handle flap 38 has a dog 39 extended from its rub 41 over the hook lug 31 and is formed at such an angle as to fit into the V shaped recess 30 as shown in FIG. 9 so that when the handle flap 38 is pulled upwardly to rotate from the position shown in FIG. 8 into the position shown in FIG. 9, the dog 39 thereof engages the recess 30 and the lug 31 and presses the same downwardly in a contra-clockwise direction about the pivot pin 17 for raising the snap hook 16 from the obstructing position shown in FIG. 8 into the non-obstructing position shown in FIG. 9 thereby to permit the removal of a ring from the receptacle cavity 2. To facilitate manipulation of the handle flap 38 the free end of the handle flap is corrugated on both faces thereof, and the edge of the bracket base 32 adjacent the free edge 42 of the handle flap 38 is recessed or cut away to form a space 43 sufficient to permit the placing of the tip of the thumb or finger under the free edge 42 for lifting the handle flap 38.

In both forms of the invention herein described, the ring frame 18 is formed in the shape of a generally rectangular frame. The cross-bar 46 of the ring frame 18 has its middle portion cut away to form a dent 47 extending from the inner periphery or edge of the cross-bar 46. This dent 47 extends along the face of the cross-bar 46 adjacent the snap hook 16 when the ring 18 is in position for insertion into or removal from under the snap hook. A shoulder 48 formed at the end of the dent 47 abuts against a downturned tip 49 of the snap hook 16 when the ring frame 44 is turned to a position generally at right angles to the plane of the elongated frame 1. The width of the longitudinal slot 3 relatively to the height of the cross-bar 46 of the ring frame 44 is such that the cross-bar 46 cannot be removed through the longitudinal slot except when the ring frame 18 is turned to a horizontal position. The height of the cross-bar 46 is greater than the height or width of the longitudinal slot 3 but the thickness of the cross-bar 46 is smaller than the height of the longitudinal slot 3 thereby to permit withdrawal only when the cross-bar 46 is turned so as to align the inner edge of the cross-bar 46 with the slot 3. When so turned the shoulder 48 of the dent 47 of the cross-bar 46 engages the snap hook 49 as aforesaid and some force has to be exerted for pulling the ring frame 18 to force the snap hook 16 upward for disengagement. The bottom or outer edge 51 of the cross-bar 46 is rounded so that when inserted into the longitudinal slot 3 it engages the rounded nose 52 of the snap hook tip 49 and pushes the same to raise the snap hook to permit insertion of the cross-bar 46 through the longitudinal slot 3.

The device herein described assures positive locking of a canopy ring or any other ring or connecting element between straps so essential for aircraft personnel.

It prevents accidental disconnection or disengagement, but when needed it permits rapid and positive manipulation for release and disconnection.

I claim:
1. In a snap fastener,
   (a) a transversely elongated body having a receptacle cavity,
   (b) a backwall on one side of said cavity,
   (c) a pair of fixed spaced hooks extending from said back wall into and through the other side of said cavity,
   (d) a dished bottom opposite said fixed hooks,
   (e) a ledge on said dished bottom opposite the tips of said fixed hooks defining an access slot to said cavity,
   (f) a snap hook pivoted between said fixed hooks and normally projecting into said cavity substantially opposite said ledge to obstruct passage through said access slot,
   (g) manipulable means extended through said back wall and being manipulable from the outside of said back wall for applying force for turning said pivoted snap hook so as to withdraw said pivoted snap hook from said obstructing position,
   (h) resilient means normally to urge said pivoted snap hook into obstructing position,
   (i) a fixed connecting loop on said body for connection to a strap,
   (j) a detachable connecting loop insertable through said slot when said pivoted snap hook is out of obstructing position,
   (k) shield means projecting from said back wall, said manipulable means being concealed in said shield means against acidental engagement laterally from either side,
   (l) a button extended from said movable hook beyond said spring pivot into said shield means and over said back wall and being offset and spaced from said back wall so that when pressed toward said back wall it turns said movable hook out of said obstructing position, said shield means including projections at least partially surrounding said button, and said shield projections being spaced to afford access for manipulation of said button.

2. In a snap fastener,
   (a) a transversely elongated body having a receptacle cavity,
   (b) a back wall on one side of said cavity,
   (c) a pair of fixed spaced hooks extending from said back wall into and through the other side of said cavity,
   (d) a dished bottom opposite said fixed hooks,
   (e) a ledge on said dished bottom opposite the tips of said fixed hooks defining an access slot to said cavity,
   (f) a snap hook pivoted between said fixed hooks and normally projecting into said cavity substantially opposite said ledge to obstruct passage through said access slot,
   (g) manipulable means extended through said back wall and being manipulable from the outside of said back wall for applying force for turning said pivoted snap hook so as to withdraw said pivoted snap hook from said cavity obstructing position,
   (h) resilient means normally to urge said pivoted snap hook into obstructing position,
   (i) a fixed connecting loop on said body for connection to a strap,
   (j) a detachable connecting loop insertable through said slot when said pivoted snap hook is out of its obstructing position,
   (k) a bracket structure on said back wall having a recessed portion,
   (l) a handle flap pivoted on said bracket portion and concealed in said recessed portion,
   (m) spring means normally urging said flap into said recess,
   (n) coacting elements on said snap hook and on said flap engageable when said flap is raised out of said recess for turning said snap hook into unobstructing position.

3. The invention defined in claim 2, and
   (o) said coacting elements being a lug extended from said pivoted snap hook toward said flap and a dog extended from said flap so as to engage and depress said lug when said handle flap is raised.

4. In a snap fastener,
   (a) a transversely elongated body having a cavity,
   (b) a loop insertable in the cavity,
   (c) a back wall on one side of said cavity,
   (d) a pair of fixed spaced hooks extending from said back wall into and through the other side of said cavity,
   (e) a dished bottom opposite said fixed hooks engageable by said loop,
   (f) a ledge on an edge of said dished bottom opposite the tips of said fixed hooks defining an access slot to said cavity,
   (g) a snap hook pivoted on said body between said fixed hooks and projecting into said cavity substantially opposite said ledge normally to obstruct passage through said access slot,
   (h) said back wall having an opening therethrough,
   (i) manipulable means manipulable from the outside of said back wall for applying force for turning said pivoted snap hook so as to withdraw said pivoted snap hook from said obstructing position,
(j) said manipulable means including an element extended from said snap hook through said backwall opening and being engageable for manipulation,
(k) resilient means normally to urge said snap hook into obstructing position,
(m) a cross-bar on said loop insertable through said access slot,
(n) the height of said cross-bar being greater than the width of said slot, and the thickness of said bar being smaller than the width of said slot so that said cross-bar is insertable and withdrawable through said slot only when turned at an angle aligning edgewise the thickness of the cross-bar with said slot,
(o) a lip on said snap hook projecting into said cavity,
(p) a portion of said cross-bar being cut away for interengagement with said snap-hook lip thereby to resist removal of said cross-bar,
(q) the outer edge of said cross-bar being rounded for engagement with said lip of said snap-hook from the outside thereby to push the snap hook out of the way for insertion of said cross-bar.

References Cited by the Examiner

UNITED STATES PATENTS

| | | | |
|---|---|---|---|
| 537,742 | 4/95 | Andrews | 294—83 |
| 2,271,335 | 1/42 | Geiger | 24—241 |
| 2,363,872 | 11/44 | Kiessling | 24—170 |
| 2,904,347 | 9/59 | Tucker | 24—230.1 |
| 3,132,395 | 5/64 | Luketa | 24—201 |
| 3,133,329 | 5/64 | Gaylord | 24—230.1 |
| 3,133,330 | 5/64 | Parr | 24—230.1 |

FOREIGN PATENTS

| | | |
|---|---|---|
| 611,524 | 3/35 | Germany. |

DONLEY J. STOCKING, *Primary Examiner.*